United States Patent [19]

Blyler, Jr. et al.

[11] Patent Number: 4,974,930
[45] Date of Patent: Dec. 4, 1990

[54] MODE SCRAMBLER WITH NON-INVASIVE FABRICATION IN AN OPTICAL FIBER'S CLADDING

[75] Inventors: Lee L. Blyler, Jr., Basking Ridge; Leonard G. Cohen, Berkeley Heights, both of N.J.; Gary J. Grimes, Thornton; Lawrence J. Haas, Broomfield, both of Colo.

[73] Assignee: AT&T Bell Laboratories, Murray Hill, N.J.

[21] Appl. No.: 434,146

[22] Filed: Nov. 13, 1989

[51] Int. Cl.[5] .............................................. G02B 6/14
[52] U.S. Cl. .............................. 350/96.29; 350/96.15; 350/96.19
[58] Field of Search ............... 350/96.15, 96.16, 96.19, 350/96.29, 96.30, 96.31, 96.33, 96.34

[56] References Cited

U.S. PATENT DOCUMENTS

| | | | |
|---|---|---|---|
| 3,891,302 | 6/1975 | Dabby et al. | 350/96.31 X |
| 3,916,182 | 10/1975 | Dabby et al. | 350/96.31 X |
| 4,176,911 | 12/1979 | Marcatili et al. | 350/96.31 |
| 4,511,209 | 4/1985 | Skutnik | 350/96.34 |
| 4,676,594 | 6/1987 | Presby | 350/96.29 |
| 4,725,110 | 2/1988 | Glenn et al. | 350/96.19 X |
| 4,749,248 | 6/1988 | Aberson, Jr. et al. | 350/96.19 |
| 4,793,680 | 12/1988 | Byron | 350/96.19 |
| 4,867,522 | 9/1989 | Cassidy | 350/96.19 |

Primary Examiner—John D. Lee
Attorney, Agent, or Firm—John C. Moran

[57] ABSTRACT

A mode scrambling arrangement for a multimode optical fiber by irradiating the cladding using an ultra-violet light to change the index of refraction of the cladding. The cladding uses a material whose index of refraction is modified in response to ultra-violet light. The exposure time and intensity of the light required is determined by monitoring the mode pattern in the multimode fiber during the irradiation to provide the desired amount of mode scrambling.

13 Claims, 2 Drawing Sheets

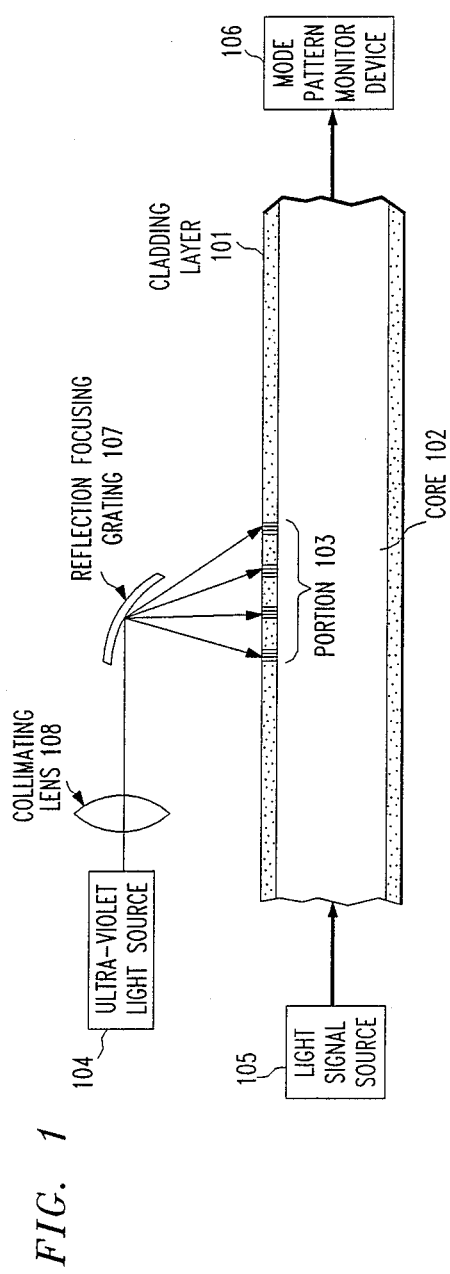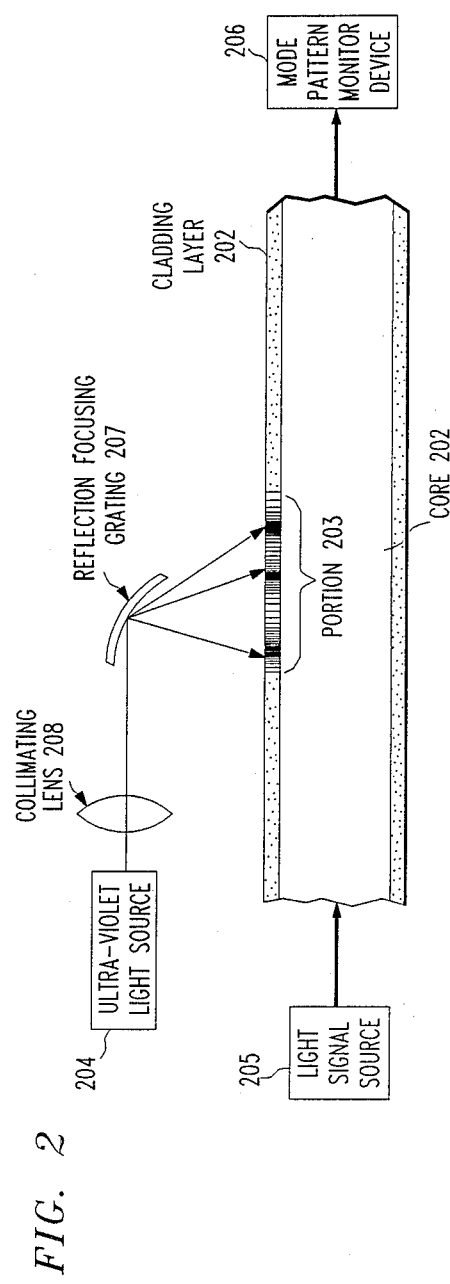

MODE SCRAMBLER WITH NON-INVASIVE FABRICATION IN AN OPTICAL FIBER'S CLADDING

TECHNICAL FIELD

This invention relates to an optical fiber mode scrambler and, more particularly, to an optical fiber mode scrambler produced by a pattern in the cladding layer of an optical fiber.

BACKGROUND OF THE INVENTION

Mode scramblers for optical fibers have found many important uses. For example, mode scramblers prevent deviation in transmission characteristics at various points along the fiber and also provide for the propagation of all the possible modes. Mode scramblers are becoming increasingly important in optical fiber Local Area Network applications to ensure that all terminals connected to a fiber bus can share information with each other. Mode scramblers mix the light modes carrying the communication so that each terminal receives an equal share of the various modes. In U.S. Pat. No. 4,676,594, one type of mode scrambler is achieved by creating a deformation such as a groove or notch on one side of a multimode or graded-index optical fiber orthogonal to the longitudinal axis thereof. The groove or notch can be produced by any suitable etching or machining process and extends through the cladding layer and at least very slightly into the outer surface of the optical fiber core The depth of the groove or notch into the core is controlled by monitoring the mode pattern in the multimode fiber during the etching or machining process to provide maximum mode scrambling. A problem with this type of mode scrambler is that light is lost when the depth of the groove extends into or through the cladding and, in particular, when the groove extends into the core's surface.

Another arrangement for an optical fiber mode scrambler is disclosed in, for example, the articles "Measurement of Baseband Frequency Response of Multimode Fiber By Using A New Type Of Mode Scrambler" by M. Tokuda et al in "Electronic Letters," Mar. 3rd, 1977, Vol. 13, No. 5 at pages 146–147; and "Transmission Characteristics Of Multimode W-Type Optical Fiber: Experimental Study Of The Effect Of The Intermediate Layer" by K. Mikoshiba et. al. in "Applied Optics," Vol. 17, No. 17, Sept. 17, 1978, at pages 2836–2841. In these articles the disclosed mode scrambler includes an optical fiber comprising specific sinusoidal serpentine bends.

Another form of an optical fiber mode scrambler is disclosed in, for example, the articles "Mode Scrambler For Optical Fibers" by M. Ikeda et al. in "Applied Optics," Apr. 1977, Vol. 16, No. 4, at pages 1045–1049; and "Mode Scrambling Can Enhance Fiber Optic System Performance" by S. L. Storozum in "Electronics," Feb. 24, 1981, Vol. 4, No. 54, at pages 163–166. The mode scrambler in these articles comprises a few fibers in a bundle surrounded by a heat shrinkable tube which when shrunk causes fiber mircrobending.

Star couplers that provide mode transfer and enhancement are also well known and comprise a first plurality of fibers interconnected to a second plurality of fibers by means of a mixing element. The mixing element is either a planar waveguide or waveguides twisted and fused together. For example, see U.S. Pat. Nos. 4,362,357 and 4,449,783 or *Fundamentals Of Optical Fiber Communications"* by M. K. Barnoski, 2nd Edition, Academic Press, 1981, at pages 337–339.

U.S. Pat. No. 4,749,248 discloses devices for coupling optical power into and/or from optical fiber. This patent discloses the use of a photorefractive effect that changes the refraction index of a single mode fiber's core and transfers energy from bound modes to so-called tunneling leakly modes (TL). The TL modes can then be removed from the cladding of the fiber guide with the aid of a dielectric body in contact with the fiber at a downstream point that has a refractive index approximately equal to or greater than the cladding index of refraction. The photorefractive effect requires that the core be treated with an appropriate dopant (e.g. Fe or Bi) and constantly exposed to light of the appropriate wavelength. If the light is removed, the index of refraction returns to its original state. In addition, this patent proposes the use of a photoelastic effect that varies the refractive index of the core by light that induces stresses into the core.

The problem remaining in the prior art is to provide a non-invasive, yet permanent mode scrambler in a multimode optical fiber which provides the desired mode scrambling with a minimum light loss.

SUMMARY OF THE INVENTION

A departure in the art is achieved by an apparatus and method for an optical fiber mode scrambler that does not require physical deformation of the optical fiber, removal of sections of the optical fiber, or the implantation of reflectors into the fiber's core. The optical fiber mode scrambler has a core of dielectric material capable of propagating a multimode light communication signal. The scrambler's outer surface is clad with a material whose refractive index may be permanently changed by exposure to radiation. The mode scrambler is fabricated by exposing different portions of the cladding to radiation in order to change the refractive index. Advantageously, the radiation used to expose and modify the cladding's refractive index is ultra-violet light. The amount of mode scrambling is also varied by changing the distance between the exposed cladding portion and/or the number of exposed portions.

A method for providing an optical fiber mode scrambler comprises the following steps: determining the desired mode scrambler location on the optical fiber and exposing the optical fiber's cladding to radiation in order to modify the refractive index. In addition, the step of exposing can further consist of varying the number of exposed cladding portions. The cladding layer's refractive index is made radiation modifiable by the step of diffusing a material into the cladding layer.

Other and further aspects of the present invention will become apparent during the course of the following description and by reference to the accompanying drawing.

BRIEF DESCRIPTION OF THE DRAWING

Referring now to the drawing:

FIG. 1 is a view in cross-section of a multimode optical fiber with an irradiated portion of the cladding that forms an optical mode scrambler in accordance with the invention;

FIG. 2 is a view in cross-section of a multimode optical fiber with a periodic pattern formed in an irradiated portion of the cladding by modification of the cladding's refractive index.

DETAILED DESCRIPTION

Figure 3:
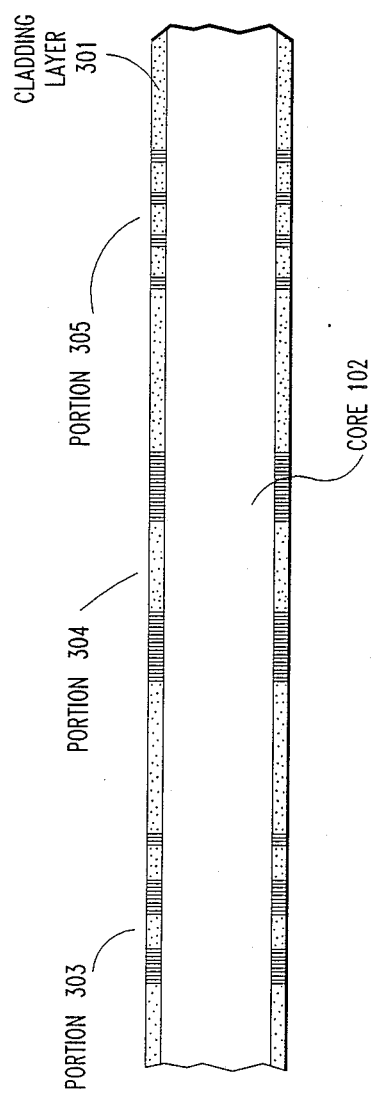
FIG. 3 is a view in cross-section of a multimode optical fiber with a plurality of FIG. 1 optical mode scramblers dispersed along the length of the fiber.

FIG. 1 is a cross-sectional view of a multimode optical fiber including core 102 of a dielectric material such as glass having a fixed refractive index and cladding layer 101 of a dielectric material having variable refractive index lower than that of core 102. Cladding layer 101 is of a material whose variable refractive index is permanently alterable when exposed to radiation such as high intensity ultra-violet light. To fabricate a mode scrambler in accordance with the present invention, portion 103 of cladding layer 101 is exposed to a striated field of ultra-violet light from reflection focusing grating 107 until a predetermined mode scrambling amount is measured by mode pattern monitor 106. The shading of portion 103 in FIG. 1 illustrates segments of the pattern formed by permanently altering the refractive index of cladding 101.

Ultra-violet light source 104 produces narrow spectrum ultra-violet light which is formed into a collimated beam by collimating lens 108. Reflection focusing grating 107 reflects and focuses this collimated beam as a strited field of light onto portion 103. A Questek Model 2860 argon flouride excimer laser is an example of such a light source and light source 104 includes a controller for varying the intensity of the laser. Other ultra-violet light sources can be constructed by those skilled in the art for cladding irradiation which allow the intensity to be varied automatically by a programmed controller.

Light signal source 105 is a standard light source, well known in the art, capable of transmitting a multi-mode light communication signal through the optical fiber. Mode pattern monitor device 106 may be any standard device that performs the function of monitoring a mode pattern. One such monitor allows the mode pattern of the light communication signal propagating in the core to fall on a screen a short distance from the end of the fiber and views the mode pattern via a television camera connected to a television monitor for ease of observation.

Portion 103 is one of many patterns that can be formed in cladding 101 by altering its index of refraction. For example, the patterns disclosed in U.S. Pat. No. 4,676,594 are usable for forming portion 103. Also, as described with respect to FIG. 2, a periodic pattern is fabricated in portion 203 by making the reflection focusing grating periodic. In addition, a pattern can be pseudo-periodic" where the period varies as a regular predetermined value of the distance (z) along the cladding. Portion 103 can be of any length by repeatedly stepping light source 104, collimating lens 108 and reflection focusing grating 107 along the length of cladding layer 101. The refractive index of cladding layer 101 can be gradually modified by varying the intensity of light source 104 while moving light source 104, collimating lens 108, and reflection focusing grating 107 along the length of cladding layer 101. Mode pattern monitor 106 is checked after each cycle until the desired mode scrambling amount is achieved.

Elements 201, 202, 204, 206, and 208 of the embodiment illustrated in FIG. 2 are identical to elements 101, 102, 104, 106, and 108 of the embodiment illustrated in FIG. 1. Reflection focusing gratings 107 and 207 are different resulting in portions 103 and 203 being different. Reflection focusing grating 207 projects a periodic pattern onto portion 203 that is defined by the following sinusoidally varying function $$n(r,z) = n_o(r)\left(1 + \delta \sin \frac{2\pi}{L_B} z\right).$$

$n_o$ is the unperturbed refractive index radial profile over the interval $z = z_o + \Delta z$ where $\Delta z = NL_B$. The periodic length between peaks is defined by $$L_B < 2\pi/\Delta\beta,$$

where $\Delta\beta$ is the difference in propagation constants between low order modes with small propagation constants and higher modes with larger constants. The characteristic length, $L_B$, is typically on the order of 1.0–2.0 mm for multimode fibers and 0.4–1.0 mm for single-mode fibers. The amount of power coupled from low order modes to higher modes depends on the peak variation of $n(r,z)$ as well as the number of cycles (N) patterned into the waveguide. Several cycles (N = 3 to 6) and an index variation, $\delta$, of several percent produce the sufficient mode scrambling.

Whereas FIG. 1 illustrates only one side of cladding layer 101 (more accurately referred to as a partial circumferential portion) as being exposed to the ultra-violet light, the other sides of cladding layer 101 could also be exposed. One skilled in the art could readily devise a technique so that ultra-violet light source 104, collimating lens 108, and grating 107 were automatically rotated at a constant speed around the optical fiber of FIG. 1 so that portion 103 would extend around the optical fiber's entire circumference. Similarly, the optical fiber could also be rotated in relation to grating 107.

Automatically rotating light source 104 and grating 107 around the fiber when the grating is periodic would result in the pattern of FIG. 2 being irradiated onto cladding layer 101 in a three dimensional manner around the optical fiber's circumference.

FIG. 3 illustrates that multiple irradiated portions 303 through 305 can be fabricated in cladding layer 301 to provide complete mode scrambling for laser cavity tuning as an example. Each of portions 303 through 305 extends around the entire optical fiber's circumference. One skilled in the art could readily design equipment to automatically fabricate irradiated portions as illustrated in FIG. 3 with periodic patterns previously described.

The refractive index of cladding layer 101 is made variable in response to ultra-violet light by diffusing a material into the cladding layer. Advantageously, cladding layer 101 may be a fluorinated acrylate such as described in U.S. Pat. No. 4,511,209. When the optical fiber is being manufactured, cladding layer 101 is placed around core 102 when the latter is being fabricated during the drawing process using standard optical fiber coating techniques. Subsequently, a monomer, which when polymerized has a different refractive index than the fluorinated acrylate cladding, is diffused into the cladding. This process can be carried out either by immersing the clad fiber in the liquid monomer or by exposing the clad fiber to the monomer vapors. Elevated temperatures may be used to accelerate the diffusion process and to increase the monomer sorption level. Acceptable monomers include methyl acrylate and trimethylopropane triacrylate. The addition of a small amount (0.5% to 5%, by weight) of a photoinitiator such as 2-hydroxy, 2-methyl, 1-phenyl propanone to the liquid monomer is beneficial in promoting the subsequent photopolymerization of the monomer with the cladding. Once the pattern has been formed in the cladding by ultra-violet light irradiation, the residual monomer in the unexposed regions of the cladding can be removed by heat or by extraction with a suitable solvent.

It is to be understood that the above-described embodiment is merely illustrative of the principles of the invention and that other arrangements may be devised by those skilled in the art without departing from the spirit and scope of the invention.

We claim:

1. An optical fiber mode scrambler comprising:
   a core of dielectric material capable of propagating a light communication signal, the core having a first refractive index;
   a cladding layer surrounding the core, said cladding layer comprising a polymer material with a monomer material diffused into said polymer material and said cladding layer having a variable refractive index in response to radiation, which is different than the first refractive index of the core; and
   a portion of said cladding layer having had its variable refractive index permanently changed to a value different than the remainder of said cladding layer by being irradiated by radiation.

2. The optical fiber mode scrambler of claim 1 wherein said radiation used for irradiation of said cladding layer is ultra-violet light.

3. The optical fiber mode scrambler of claim 1 wherein a small amount of photoinitiator material by weight is added to said monomer material.

4. The optical fiber mode scrambler of claim 3 wherein said plurality of segments are irradiated so as to form a periodic pattern in said refractive index of said cladding layer.

5. The optical fiber mode scrambler of claim 4 wherein said periodic pattern has a periodicity such as to transfer lower modes of said light signal to higher modes.

6. The optical fiber mode scrambler of claim 3 wherein said portion extends around the circumference of said cladding layer.

7. A method for fabricating an optical fiber mode scrambler in an optical fiber having a core capable of propagating a light communication signal with said core having a first refractive index and a polymer cladding layer surrounding said core and said polymer cladding layer having a refractive index that is different than said first refractive index, comprising the steps of:
   diffusing a monomer material into said polymer cladding layer thereby resulting in said polymer cladding layer having a refractive index that is variable in response to radiation;
   irradiating with radiation a portion of said polymer cladding layer to permanently change its variable refractive index to a value different than the remainder of said polymer cladding layer.

8. The method of claim 7 wherein said radiation used in said irradiating step is an ultra-violet light.

9. The method of claim 7 wherein said step of diffusing comprising adding a photoinitiator to said monomer material.

10. The method of claim 9 wherein said step of irradiating comprises the step of applying a different amount of radiation to each of a plurality of segments to form a periodic pattern in said refractive index of said polymer cladding layer.

11. The method of claim 10 wherein said periodic pattern has a periodicity such as to transfer lower modes of a multimode light signal to higher modes.

12. The method of claim 9 wherein said portion extends around the circumference of said polymer cladding layer.

13. The method of claim 7 further comprising the step of removing said diffused material from said polymer cladding layer except at said portion.

* * * * *